(12) United States Patent
Sugiyasu (10) Patent No.: US 9,145,032 B2
(45) Date of Patent: Sep. 29, 2015

(54) TIRE

(75) Inventor: Shinpei Sugiyasu, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 516 days.

(21) Appl. No.: 13/575,821

(22) PCT Filed: Jan. 25, 2011

(86) PCT No.: PCT/JP2011/051314
§ 371 (c)(1),
(2), (4) Date: Sep. 20, 2012

(87) PCT Pub. No.: WO2011/093266
PCT Pub. Date: Aug. 4, 2011

(65) Prior Publication Data
US 2013/0000806 A1    Jan. 3, 2013

(30) Foreign Application Priority Data
Jan. 28, 2010  (JP) ................................. 2010-016418

(51) Int. Cl.
*B60C 11/13*  (2006.01)
*B60C 11/04*  (2006.01)
*B60C 11/03*  (2006.01)

(52) U.S. Cl.
CPC ............. *B60C 11/042* (2013.04); *B60C 11/032* (2013.04); *B60C 11/047* (2013.04);
(Continued)

(58) Field of Classification Search
CPC .. B60C 11/032; B60C 11/042; B60C 11/045; B60C 11/047; B60C 11/1315; B60C 11/1323; B60C 2011/1361

USPC ............................ 152/209.17, 209.18, 209.24
See application file for complete search history.

(56) References Cited

U.S. PATENT DOCUMENTS 3,409,064 A * 11/1968 Lonsdale ................. 152/209.17
3,664,402 A *  5/1972 Montagne ................ 152/209.24
(Continued)

FOREIGN PATENT DOCUMENTS

GB          655710   *  8/1951
GB          1351392  *  4/1974
(Continued)

OTHER PUBLICATIONS

English machine translation of JP05-338414, dated Dec. 1993.*
(Continued)

*Primary Examiner* — Steven D Maki
*Assistant Examiner* — Robert Dye
(74) *Attorney, Agent, or Firm* — Sughrue Mion, PLLC (57) ABSTRACT

A land portion of a pneumatic tire 1 comprises a land portion 10 having groove wall 10a a second land portion 20 having a groove wall 20a. The groove walls 10a, 20a meander. A groove width of a main groove 50 changes at a predetermined repetition cycle. The main groove 50 includes: a wide groove portion 50A having a predetermined width; and a narrow groove portion 50B which is continuous with the wide groove portion and which is narrower than the predetermined width. A relationship of θ1>θ2 is satisfied where θ1 refers to an angle formed between a tire normal line RL and the groove wall 10a or the groove wall 20a forming the wide groove portion 50A and θ2 refers to an angle formed between the tire normal line RL and the groove wall 10a or the groove wall 20a forming the narrow groove portion 50B.

8 Claims, 8 Drawing Sheets

(52) U.S. Cl.
CPC ..... *B60C11/1315* (2013.04); *B60C 2011/0344* (2013.04); *B60C 2011/0346* (2013.04); *B60C 2011/0353* (2013.04); *B60C 2011/0381* (2013.04); *B60C 2011/1361* (2013.04)

(56) References Cited

U.S. PATENT DOCUMENTS

| | | | |
|---|---|---|---|
| 5,373,882 A | | 12/1994 | Nakagawa |
| 6,026,874 A * | | 2/2000 | Shibata et al. ............. 152/209.2 |
| 7,607,464 B2 * | | 10/2009 | Murata .................... 152/209.24 |
| 2006/0032567 A1 | | 2/2006 | Oh |
| 2009/0218019 A1 * | | 9/2009 | Paturle .................... 152/209.18 |

FOREIGN PATENT DOCUMENTS

| | | | |
|---|---|---|---|
| JP | 63-25107 A | | 2/1988 |
| JP | 5-254313 A | | 10/1993 |
| JP | 05-338414 | * | 12/1993 |
| JP | 6-4365 B2 | | 1/1994 |
| JP | 6-316203 A | | 11/1994 |
| JP | 8-11508 A | | 1/1996 |
| JP | 2005-170381 A | | 6/2005 |
| JP | 2006-56480 A | | 3/2006 |
| JP | 2006-315475 A | | 11/2006 |
| JP | 2007-314029 A | | 12/2007 |
| JP | 2010-18125 A | | 1/2010 |

OTHER PUBLICATIONS

English machine translation of JP2006-315475, dated Nov. 2006.*
Korean Office Action, dated Sep. 16, 2013, issued in counterpart Korean Patent Application No. 10-2012-7019720.
International Search Report of PCT/JP2011/051314, dated Mar. 15, 2011).
Chinese Official Action Letter, dated Mar. 25, 2014, issued in counterpart Chinese Patent Application No. 201180007249X.
Extended European Search Report, dated Jun. 6, 2014, issued in counterpart European Patent Application No. 11736979.3.

* cited by examiner

TIRE

CROSS REFERENCE TO RELATED APPLICATIONS

This application is a National Stage of International Application No. PCT/JP2011/051314, filed on Jan. 25, 2011, which claims priority from Japanese Patent Application No. 2010-016418, filed on Jan. 28, 2010, the contents of all of which are incorporated herein by reference in their entirety.

TECHNICAL FIELD

The present invention relates to a tire including a land portion formed by a main groove extending in a tire circumferential direction.

BACKGROUND ART

Conventionally, pneumatic tires (hereafter, tires) widely use a method in which a main groove extending in a tire circumferential direction is formed in a tread in order to improve drainage of rain water entering a space between a road surface and the tread.

For example, a tire is known which is provided with protrusions protruding from a groove bottom portion of the main groove and extending in a tread width direction in order to actively drain rain water entering the main groove (for example, Patent Document 1). Such a tire generates a water flow in rain water entering the main groove and thereby drainage is improved.

PRIOR ART DOCUMENT

Patent Document

PATENT DOCUMENT 1: Japanese Patent Application Publication No. 2005-170381 (page 3, FIG. 2)

SUMMARY OF THE INVENTION

However, the conventional tire described above has the following problems. Specifically, the land portions formed by the main groove has high stiffness in places where the protrusions are continuous with sidewalls of the land portions while having low stiffness in places where no protrusions are continuous with the land portions. Accordingly, the stiffness of the land portions is uneven in the tire circumferential direction. Hence, the contact pressure of the land portions in contact with the road surface is uneven in the tire circumferential direction, and this causes problems such as occurrence of uneven wear and deterioration in driving stability.

In view of these problems, an objective of the present invention is to provide a tire that, even having a main groove formed therein, can surely suppress deterioration in driving stability with drainage being improved.

To solve the above mentioned problem, the present invention has a following characteristic. The first characteristic of the present invention is a tire (e.g., pneumatic tire 1) comprising at least a land portion (land portion 10) formed by a main groove (e.g., main groove 50) extending in a tire circumferential direction (tire circumferential direction TC), the land portion including: a first land portion (e.g., land portion 10) having a first groove wall (e.g., groove wall 10a) forming the main groove; and a second land portion (e.g., land portion 20) having a second groove wall (e.g., groove wall 20a) forming the main groove, wherein the first groove wall and the second groove wall meander in the tire circumferential direction in a tread surface view, a groove width of the main groove in a tread width direction changes at a predetermined repetition cycle in the tire circumferential direction, the main groove includes: a wide groove portion (wide groove portion 50A) in which the groove width is a predetermined width; and a narrow groove portion (narrow groove portion 50B) which is continuous with the wide groove portion and which is narrower than the predetermined width, and a relationship of θ1>θ2 is satisfied in a cross section taken in the tread width direction and a tire radial direction where θ1 refers to an angle formed between a tire normal line (tire normal line RL) extending in the tire radial direction and at least one of the first groove wall and the second groove wall forming the wide groove portion and θ2 refers to an angle formed between the tire normal line and at least one of the first groove wall and the second groove wall forming the narrow groove portion.

In the characteristic described above, the first groove wall and the second groove wall meander in the tire circumferential direction in the tread surface view and the groove width of the main groove changes at the predetermined cycle λ in the tire circumferential direction. This generates water flows along the meandering of the first groove wall and the second groove wall in the main groove. In other words, water flows along the first groove wall and the second groove wall are generated in the main groove.

Specifically, after passing through the wide groove portion, water flowing in the main groove is drained from the wide groove portion to the narrow groove portion in directions of extended lines of streamlines along the first groove wall and the second groove wall, along with the decrease in groove width of the main groove. In other words, the water flowing in the main groove pulsates at the predetermined repetition cycle and is drained from the wide groove portion to the narrow groove portion in the directions of the extended lines of the streamlines along the first groove wall and the second groove wall. Accordingly, it is possible to suppress deterioration in drainage of draining water entering a space between the road surface and the tread.

Incidentally, when the first groove wall and the second groove wall forming the main groove extend along the tire normal lines (when the θ1 and θ2 are 0°), the following situation occurs. Specifically, in a portion protruding into the main groove due to the narrow groove portion (wide land portion), the stiffness of the land portion is increased by an amount corresponding to the protruding of the portion into the main groove. Meanwhile, in a portion recessed into the land portion due to the wide groove portion (narrow land portion), the stiffness of the land portion is reduced by an amount corresponding to the recessing of the portion into the land portion.

However, it is possible to reduce the stiffness of the portion protruding into the main groove due to the narrow groove portion and to increase the stiffness of the portion recessed into the land portion due to the wide groove portion, by satisfying the relationship of θ1>θ2. In other words, the stiffness of the land portion is more likely to be even in the tire circumferential direction than the case where θ1 and θ2 are 0°. Accordingly, the contact pressure in the land portion is made even in the tire circumferential direction and occurrence of uneven wear and deterioration in driving stability are thereby surely suppressed.

The second characteristic of the present invention according to the first characteristic of the present invention is that the first groove wall and the second groove wall are symmetric to each other in the tread surface view with a center line (e.g., tire equator line CL) being an axis, the center line passing through a center of the main groove in the tread width direction.

The third characteristic of the present invention according to the first or second characteristic of the present invention is that the area (area S50A) of the wide groove portion and the area (area S50B) of the narrow groove portion are the same in cross sections in the tread width direction and the tire radial direction.

The fourth characteristic of the present invention according to the first to third characteristics of the present invention is the main groove is provided with a wide groove portion (wide groove portion 50A) including a greatest-width section WMAX, and a raised portion (raised portion 70) raised outward in the tire radial direction is formed in a bottom portion (e.g., bottom portion 50btm) of the main groove, and the raised portion is formed in the wide groove portion.

The fifth characteristic of the present invention according to the fourth characteristic of the present invention is that a first side portion (side portion 70a) of the raised portion which faces the first groove wall extends along the first groove wall, and a second side portion (side portion 70b) of the raised portion which faces the second groove wall extends along the second groove wall.

The sixth characteristic of the present invention according to the fourth or fifth characteristic of the present invention is that the raised portion becomes narrower toward a front end section (front end section 70f) and a rear end section (rear end section 70r) of the raised portion in the tread surface view.

The seventh characteristic of the present invention according to the fourth to sixth characteristics of the present invention is that a height (raised height 70) of the raised portion is smaller than a depth (main groove depth H50) of the main groove.

The eighth characteristic of the present invention according to the first to seventh characteristics of the present invention is the land portion includes: a wide land portion (wide land portion 11, 21) in which a width of the land portion in the tread width direction is a predetermined width; and a narrow land portion (narrow land portion 12, 22) which is narrower than the predetermined width, and a surface of the wide land portion is provided with a recessed portion (recessed portion 80) recessed from a surface of the land portion inward in the tire radial direction.

The ninth characteristic of the present invention according to the ninth characteristic of the present invention is the recessed portion is formed to have such a tapered shape in the tread surface view that a width dimension in the tread width direction gradually becomes smaller toward an end portion thereof in the tire circumferential direction.

The characteristics of the present invention provide a tire that, even having a main groove formed therein, can surely suppress deterioration in driving stability with drainage being improved.

BRIEF DESCRIPTION OF THE DRAWINGS

FIG. 4 Part (a) of FIG. 4 is a cross-sectional view (cross-sectional view taken along the line A-A in FIG. 1) showing a wide groove portion 50A of the first embodiment. Part (b) of FIG. 4 is a cross-sectional view (cross-sectional view taken along the line B-B in FIG. 1) showing a narrow groove portion 50B of the first embodiment.

Part (a) of FIG. 7 is a cross-sectional view (cross-sectional view taken along the line A-A in FIG. 6) showing a wide groove portion 50A of the second embodiment. Part (b) of FIG. 7 is a cross-sectional view (cross-sectional view taken along the line B-B in FIG. 6) of a narrow groove portion 50B of the second embodiment.

MODES FOR CARRYING OUT THE INVENTION

Next, embodiments of a pneumatic tire of the present invention are described with reference to the drawings. Specifically, descriptions are given of (1) First Embodiment, (2) Second Embodiment, (3) Comparative Evaluations, and (4) Other Embodiments.

Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) First Embodiment

A pneumatic tire 1 of the first embodiment is described below with reference to the drawings. Specifically, descriptions are sequentially given of (1.1) Configuration of Pneumatic Tire, (1.2) Detailed Configuration of Main Groove, (1.3) Detailed Configuration of Land Portions, and (1.4) Operations and Effects.

(1.1) Configuration of Pneumatic Tire

Figure 1:
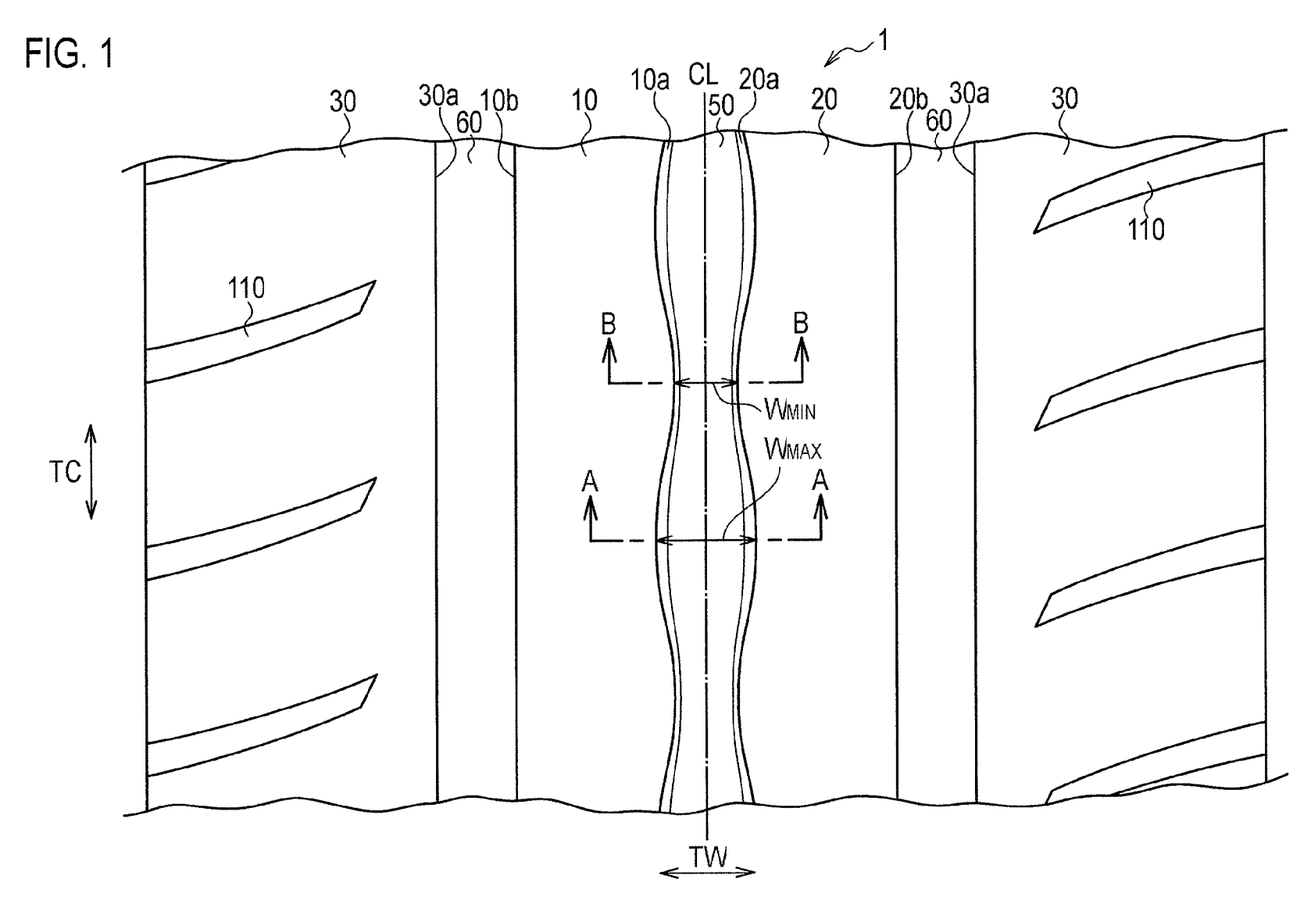
FIG. 1 is a developed view showing a tread pattern of the pneumatic tire 1 of the first embodiment.

First, the pneumatic tire 1 of the first embodiment is described with reference to the drawings. FIG. 1 is a developed view showing a tread pattern of the pneumatic tire 1 of the first embodiment.

As shown in FIG. 1, the pneumatic tire 1 includes a land portion 10, a land portion 20, and a land portion 30 which have rib-like shapes, extend in a tire circumferential direction TC, and come into contact with a road surface. A main groove 50 extending in the tire circumferential direction TC is formed between the land portion 10 and the land portion 20. Meanwhile, a main groove 60 extending in the tire circumferential direction TC is formed between the land portion 10 and the land portions 30. In other words, the land portions 10, 20, 30 are formed by the main grooves 50 and 60.

The land portion 10 has a groove wall 10a forming the main groove 50 and a groove wall 10b forming the main groove 60. The land portion 20 has a groove wall 20a forming the main groove 50 and a groove wall 20b forming the main groove 60. The land portion 30 has a groove wall 30a forming the main groove 60. Moreover, lateral grooves 110 opening to an outer side in a tread width direction TW are formed in the land portion 30.

Meanwhile, the main groove 50 is provided on a tire equator line CL. A detailed configuration of the main groove 50 is described later. The main groove 60 is provided on an outer side of the tire equator line CL in the tread width direction TW. The main groove 60 extends linearly in the tire circumferential direction TC.

In the first embodiment, the configuration of the tire on one side (left side in FIG. 1) of the tire equator line CL in the tread width direction TW has been described. Since the configuration of the tire on the other side (right side in FIG. 1) is almost the same as that of the one side described above, a detailed description thereof is omitted.

(1.2) Detailed Configuration of Main Groove

Figure 2:
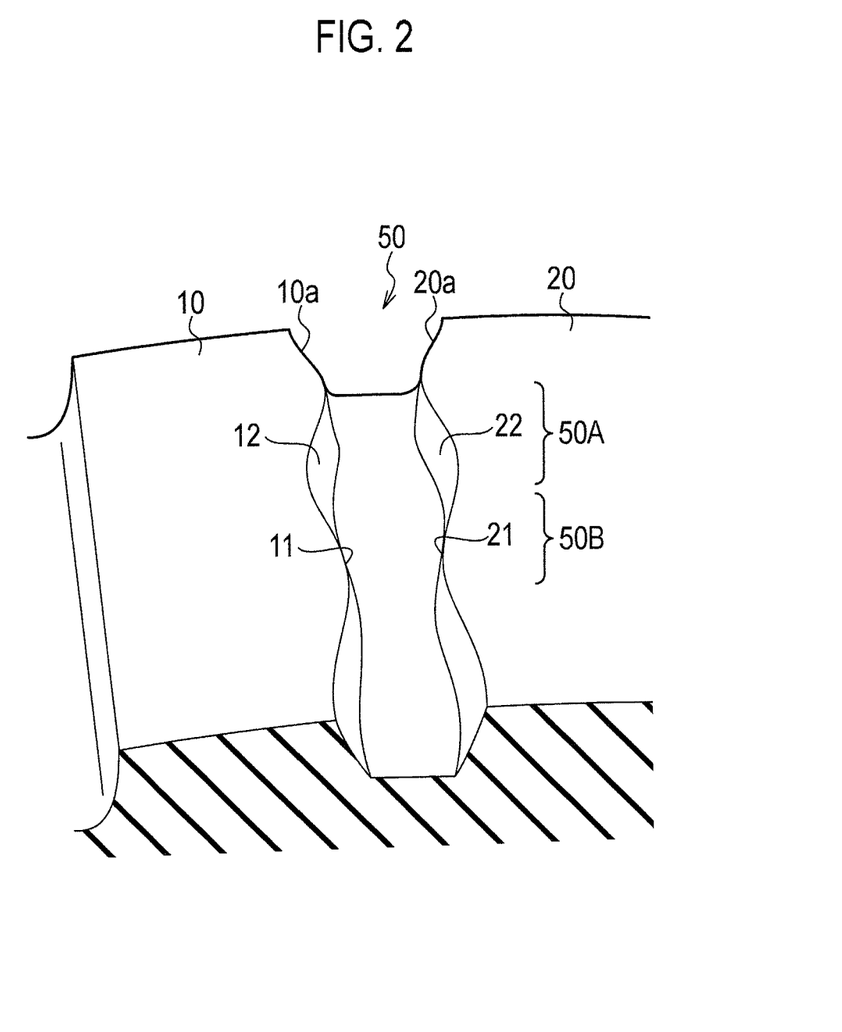
FIG. 2 is a perspective view showing the main groove 50 of the first embodiment and its vicinity.
Figure 3:
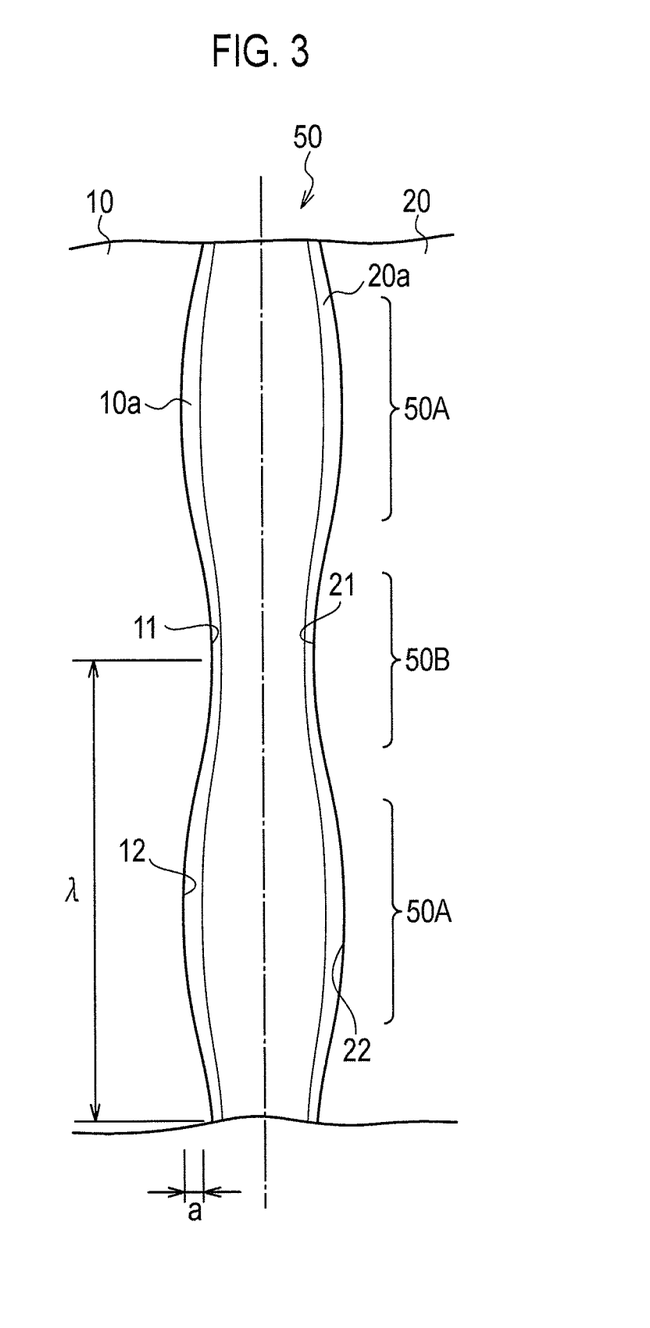
FIG. 3 is an enlarged developed view showing the main groove 50 of the first embodiment.
Figure 4:
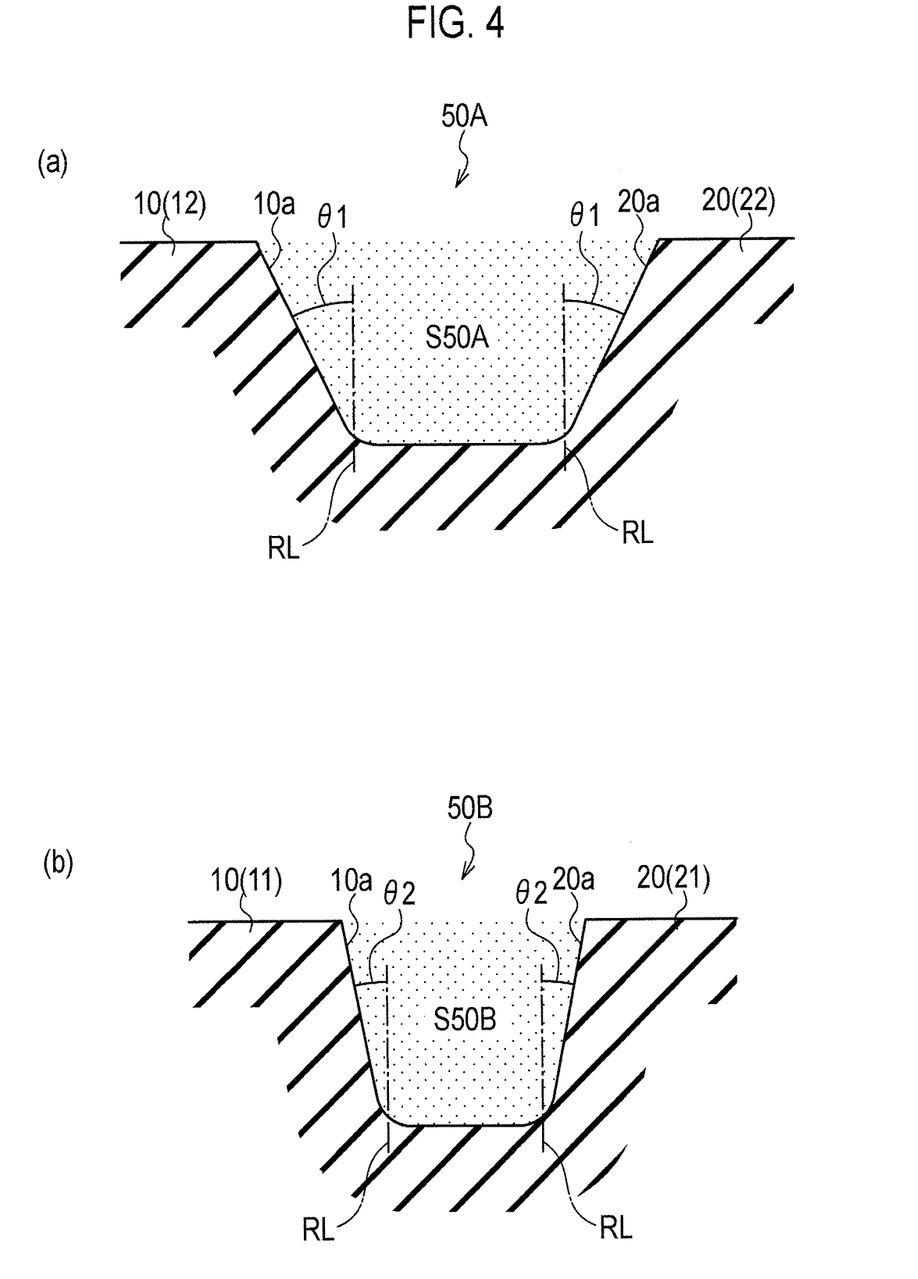

Next, the detailed configuration of the aforementioned main groove 50 is described with reference to FIGS. 1 to 4. FIG. 2 is a perspective view showing the main groove 50 of the first embodiment and its vicinity. FIG. 3 is an enlarged developed view showing the main groove 50 of the first embodiment. Part (a) of FIG. 4 is a cross-sectional view (cross-sectional view taken along the line A-A in FIG. 1) showing a wide groove portion 50A of the first embodiment. Part (b) of FIG. 4 is a cross-sectional view (cross-sectional view taken along the line B-B in FIG. 1) showing a narrow groove portion 50B of the first embodiment.

As shown in FIGS. 1 to 3, the main groove 50 is formed by the groove wall 10a of the land portion 10 and the groove wall 20a of the land portion 20. The groove wall 10a and the groove wall 20a meander in the tire circumferential direction TC in a tread surface view. The groove wall 10a and the groove wall 20a are provided to be symmetric to each other with a center line (tire equator line CL) of the main groove 50 being the axis. For example, the wave length of the groove wall 10a and the wave length of the groove wall 20a are offset from each other by a predetermined wave length (for example, half-wave length).

The main groove 50 has a groove width which changes at a predetermined repetition cycle in the tire circumferential direction TC. Note that the groove width of the main groove 50 refers to a width in the tread width direction TW and refers to a distance from a certain point on the groove wall 10a to the groove wall 20a in the tread width direction TW.

As shown in FIG. 3, the groove width of the main groove 50 changes at a cycle λ in the tire circumferential direction TC. Specifically, the groove wall 10a and the groove wall 20a have a predetermined amplitude a in the tread width direction TW. Moreover, the groove wall 10a and the groove wall 20a change at the cycle λ in the tire circumferential direction TC, in the tread surface view.

The cycle λ of the groove wall 10a and the groove wall 20a in the tire circumferential direction TC is 15 to 100 times the predetermined amplitude a. Moreover, when the tire is rolling, a tread length of a tread in contact with the road surface in the tire circumferential direction TC is 0.5 to 20 times the cycle λ of the main groove 50.

The main groove 50 as described above includes the wide groove portions 50A and the narrow groove portions 50B. In each of the wide groove portions 50A, the groove width of the main groove 50 is a predetermined width. Moreover, each wide groove portion 50A includes a greatest-width section WMAX. Meanwhile, each of the narrow groove portions 50B is continuous with corresponding ones of the wide groove portions 50A and a groove width of the main groove 50 is smaller than the predetermined width in the narrow groove portion 50B. Moreover, each narrow groove portion 50A includes a smallest-width section WMIN of the groove width of the main groove 50 in the tread width direction TW.

The wide groove portions 50A and the narrow groove portions 50B are provided alternately in the tire circumferential direction TC. Moreover, the wide groove portions 50A and the narrow groove portions 50B are made with continuous curved lines in the tread surface view.

Here, a relationship of $(WMAX-WMIN)/A \leq 0.25$ is satisfied, where WMAX refers to the greatest-width section of the groove width of the main groove 50, WMIN refers to the smallest-width section of the groove width of the main groove 50, and A refers to an average length of the main groove 50 in the tread width direction TW (see FIG. 1). Moreover a ratio WMIN/WMAX of the smallest-width section WMIN of the groove width of the main groove 50 to the greatest-width section WMAX of the groove width of the main groove 50 is within a range of 35% to 85%.

As shown in parts (a) and (b) of FIG. 4, a relationship of $\theta 1 > \theta 2$ is satisfied, where $\theta 1$ refers to an angle formed between each of the groove wall 10a and the groove wall 20a forming the wide groove portion 50A and a corresponding one of tire normal lines RL extending in the tire radial direction TR and $\theta 2$ refers to an angle formed between each of the groove wall 10a and the groove wall 20a forming the narrow groove portion 50B and a corresponding one of the tire normal lines RL, in cross sections taken in the tread width direction TW and a tire radial direction TR.

Moreover, in the cross sections taken in the tread width direction TW and the tire radial direction TR, an area S50A (volume) of the wide groove portion 50A is almost the same as an area S50B (volume) of the narrow groove portion 50B. The area S50A of the wide groove portion 50A and the area S50B of the narrow groove portion 50B refer to dotted areas in part (a) and (b) of FIG. 4, respectively. Particularly, the cross-sectional area of the main groove 50 is preferably the same in the tire circumferential direction TC.

(1.3) Detailed Configuration of Land Portions

Next, the detailed configuration of the land portions 10 and 20 described above is described with reference to FIG. 3. As shown in FIG. 3, the land portion 10 has wide land portions 11 and narrow land portions 12 due to the meandering of the groove wall 10a and the groove wall 20a, which form the main groove 50, in the tire circumferential direction TC.

In each of the wide land portions 11, the width of the land portion 10 in the tread width direction TW is a predetermined width. Moreover, each wide land portion 11 is adjacent to a corresponding one of the narrow groove portions 50B. Meanwhile, each of the narrow land portions 12 is continuous with corresponding ones of the wide land portions 11 and the width of the land portion 10 in the narrow land portion 12 is smaller than the predetermined width. Each narrow land portion 12 is adjacent to a corresponding one of the wide groove portions 50A.

Similarly, the land portion 20 has wide land portions 21 and narrow land portions 22. The wide land portions 21 have a similar configuration as that of the wide land portions 11 described above. Moreover, the narrow land portions 22 have a similar configuration as that of the narrow land portions 12.

(1.4) Operations and Effects

In the first embodiment described above, the groove wall 10a and the groove wall 20a meander in the tire circumferential direction TC in the tread surface view and the groove width of the main groove 50 changes at the predetermined cycle λ in the tire circumferential direction TC. This generates water flows along the meandering of the groove wall 10a and the groove wall 20a in the main groove 50. In other words, a streamline S10a and a streamline S20a, which are respectively water flows along the groove wall 10a and the groove wall 20a, are generated in the main groove 50 (see FIG. 3).

Specifically, after passing through each wide groove portion 50A (greatest-width section WMAX), water flowing in the main groove 50 is drained from the wide groove portion 50A to the adjacent narrow groove portion 50B (smallest-width section WMIN) in a direction of extended lines of the streamlines (streamline S10a and streamline S20a) along the groove wall 10a and the groove wall 20a, along with the decrease in groove width of the main groove 50. In other words, the water flowing in the groove 50 pulsates at the predetermined cycle λ and is drained from the wide groove portion 50A to the narrow groove portion 50B in the direction of the extended lines of the streamlines along the groove wall 10a and the groove wall 20a. Accordingly, it is possible to suppress deterioration in drainage of draining water entering a space between the road surface and the tread.

Incidentally, when the groove wall 10a and the groove wall 20a forming the main groove 50 extend along the tire normal lines RL (when the θ1 and θ2 are 0°), the following situation occurs. Specifically, in the wide land portions 11, 21 (see FIG. 3) of the land portions 10, 20 which protrude into the main groove 50 due to the narrow groove portions 50B, the stiffness of the land portions 10, 20 are increased by an amount corresponding to the protruding of the wide land portions 11, 21 into the main groove 50. Meanwhile, in the narrow land portions 12, 22 (see FIG. 3) which are recessed into the land portions 10, 20 due to the wide groove portions 50A, the stiffness of the land portions 10, 20 are reduced by an amount corresponding to the recessing of the narrow land portions 12, 22 into the land portions 10, 20.

However, it is possible to reduce the stiffness of wide land portions 11, 21 and to increase the stiffness of the narrow land portions 12, 22 by satisfying the relationship of θ1>θ2. In other words, the stiffness of the land portions 10, 20 is more likely to be even in the tire circumferential direction TC than the case where θ1 and θ2 are 0°. Accordingly, the contact pressure in the land portions 10, 20 is made even in the tire circumferential direction TC and occurrence of uneven wear and deterioration in driving stability are thereby surely suppressed.

In the first embodiment, the groove wall 10a and the groove wall 20a are symmetric in the tread surface view with the center line (tire equator line CL) of the main groove 50 being the axis. This causes a vibration frequency occurring when the tread comes into contact with the road surface to change in the tire circumferential direction TC. Accordingly, a sound pressure level at the peak can be reduced. Hence, a noise characteristic and a vibration characteristic can be improved while deterioration in drainage, occurrence of uneven wear, and deterioration in driving stability are maintained at excellent levels.

In the first embodiment, the area S50A of each wide groove portion 50A is the same as the area S50B of each narrow groove portion 50B. This causes the water in the main groove 50 to flow smoothly even when the water enters the narrow groove portion 50B. Deterioration in drainage is more surely suppressed than the case where the area S50B of each narrow groove portion 50B is smaller than the area S50A of each wide groove portion 50A (for example, the case where a bottom portion 50btm of the main groove 50 is formed to have a smooth flat shape).

Particularly, the cross-sectional area of the main groove 50 being the same along the tire circumferential direction TC surely improves the noise characteristic and the vibration characteristic compared to the case where the cross-sectional area of the main groove 50 changes along the tire circumferential direction TC.

In the first embodiment, the ratio WMIN/WMAX of the smallest-width section WMIN of the groove width of the main groove 50 to the greatest-width section WMAX of the groove width of the main groove 50 is within the range of 35% to 85%. When the ratio WMIN/WMAX is smaller than 35%, in some cases, the water flows along the groove wall 10a and the groove wall 20a and a water flow in the tire circumferential direction TC excessively concentrate at the smallest-width section WMIN and deterioration in drainage cannot be suppressed. Meanwhile, when the ratio WMIN/WMAX is larger than 85%, in some cases, the pulsation of water in the main groove 50 is hindered and the improvement in drainage is thereby hindered.

In the first embodiment, the groove wall 10a and the groove wall 20a have the predetermined amplitude a in the tread width direction TW and the cycle λ is 15 times to 100 times the predetermined amplitude a. When the cycle λ is smaller than 15 times the predetermined amplitude a, in some cases, the water flows along the groove wall 10a and the groove wall 20a and the water flow in the tire circumferential direction TC excessively concentrate at the smallest-width section WMIN and deterioration in drainage cannot be suppressed. Meanwhile, when the cycle λ is larger than 100 times the predetermined amplitude a, in some cases, the pulsation of water in the main groove 50 is hindered and the improvement in drainage is thereby hindered.

In the first embodiment, the tread length of the tread in contact with the road surface in the tire circumferential direction TC is 0.5 to 20 times the cycle λ of the main groove 50 when the tire is rolling. When the tread length is smaller than 0.5 times the cycle λ of the main groove 50, in some cases, the pulsation of water in the main groove 50 is hindered and the improvement in drainage is thereby hindered. Meanwhile, when the tread length is larger than 20 times the cycle λ of the main groove 50, in some cases, the water flows along the groove wall 10a and the groove wall 20a and the water flow in the tire circumferential direction TC excessively concentrate at the smallest-width section WMIN and the deterioration in drainage cannot be suppressed.

(2) Second Embodiment

A pneumatic tire 2 of the second embodiment is described below with reference to the drawings. Portions which are the same as those of the pneumatic tire 1 of the first embodiment described above are denoted by the same reference numerals and portions which are different are mainly described.

In the first embodiment described above, no raised portions to be described later are provided in the main groove 50 of the first pneumatic tire 1. Moreover, no recessed portions to be described later are formed in the land portions 10, 20 of the pneumatic tire 1.

On the other hand, in the second embodiment, the raised portions to be described later are provided in a main groove 500 of the pneumatic tire 2. Moreover, the recessed portions to be described later are formed in land portions 10, 20 of the pneumatic tire 2.

Specifically, in the second embodiment, descriptions are given of (2.1) Detailed Configuration of Main Groove, (2.2) Detailed Configuration of Land Portions, and (2.3) Operations and Effects, with reference to the drawings.

(2.1) Detailed Configuration of Main Groove

Figure 5:
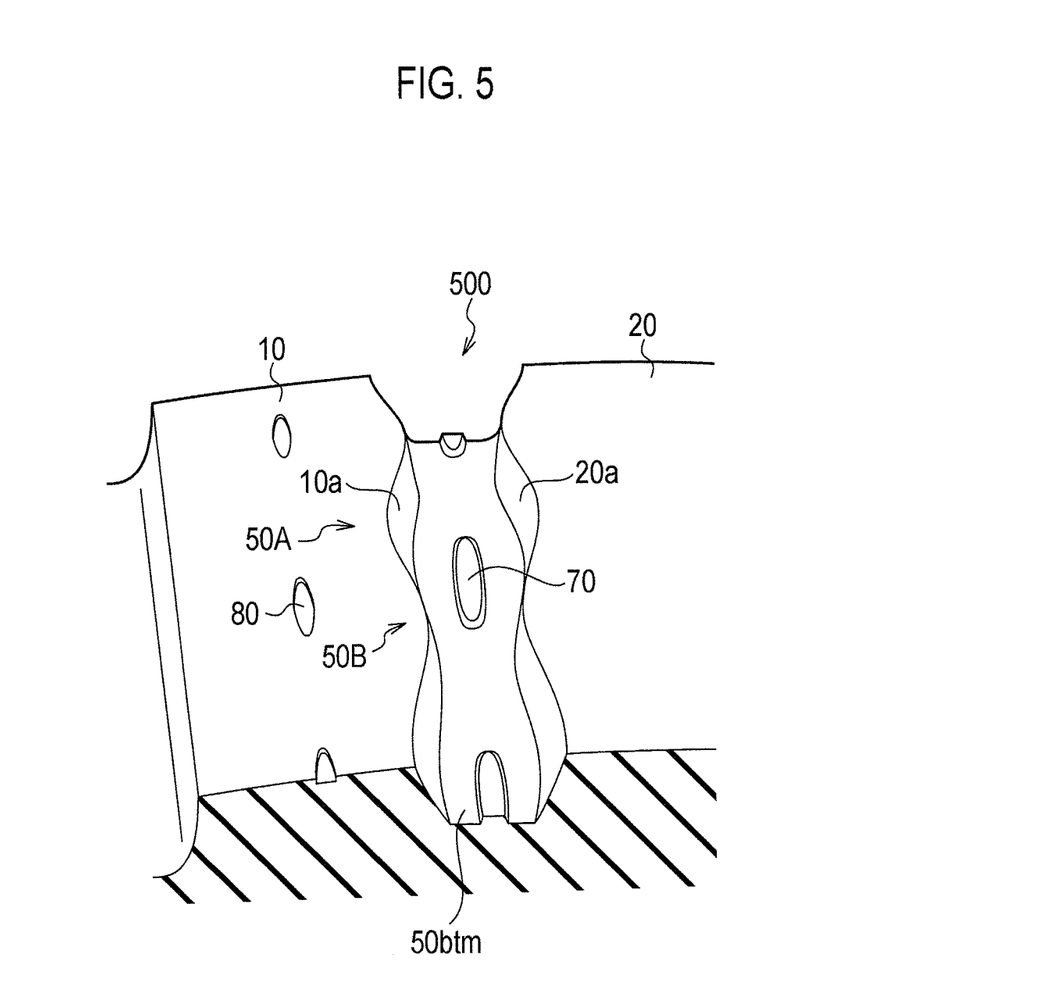
FIG. 5 is a perspective view showing the main groove 500 of the second embodiment and its vicinity.
Figure 6:
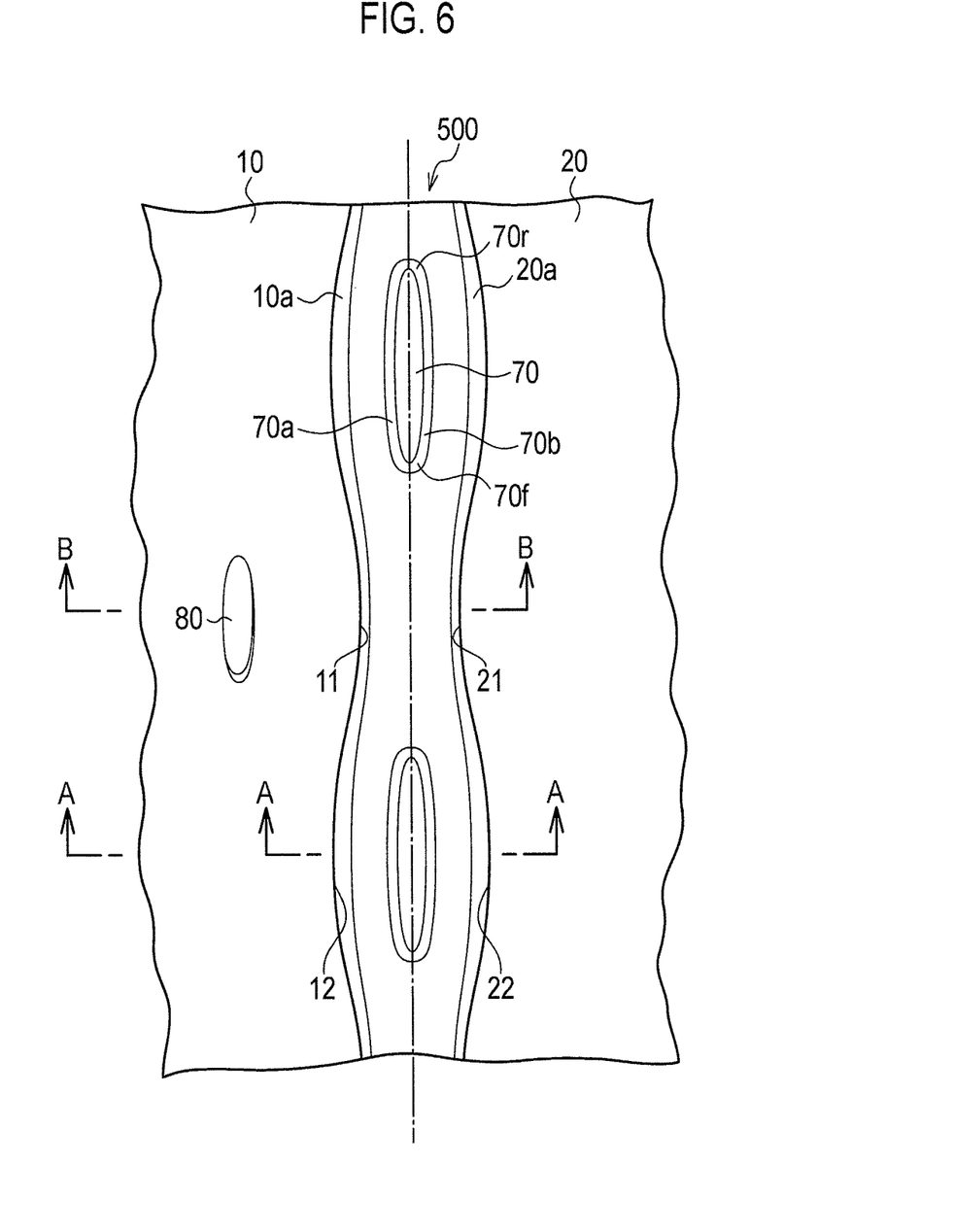
FIG. 6 is an enlarged developed view showing the main groove 500 of the second embodiment.
Figure 7:
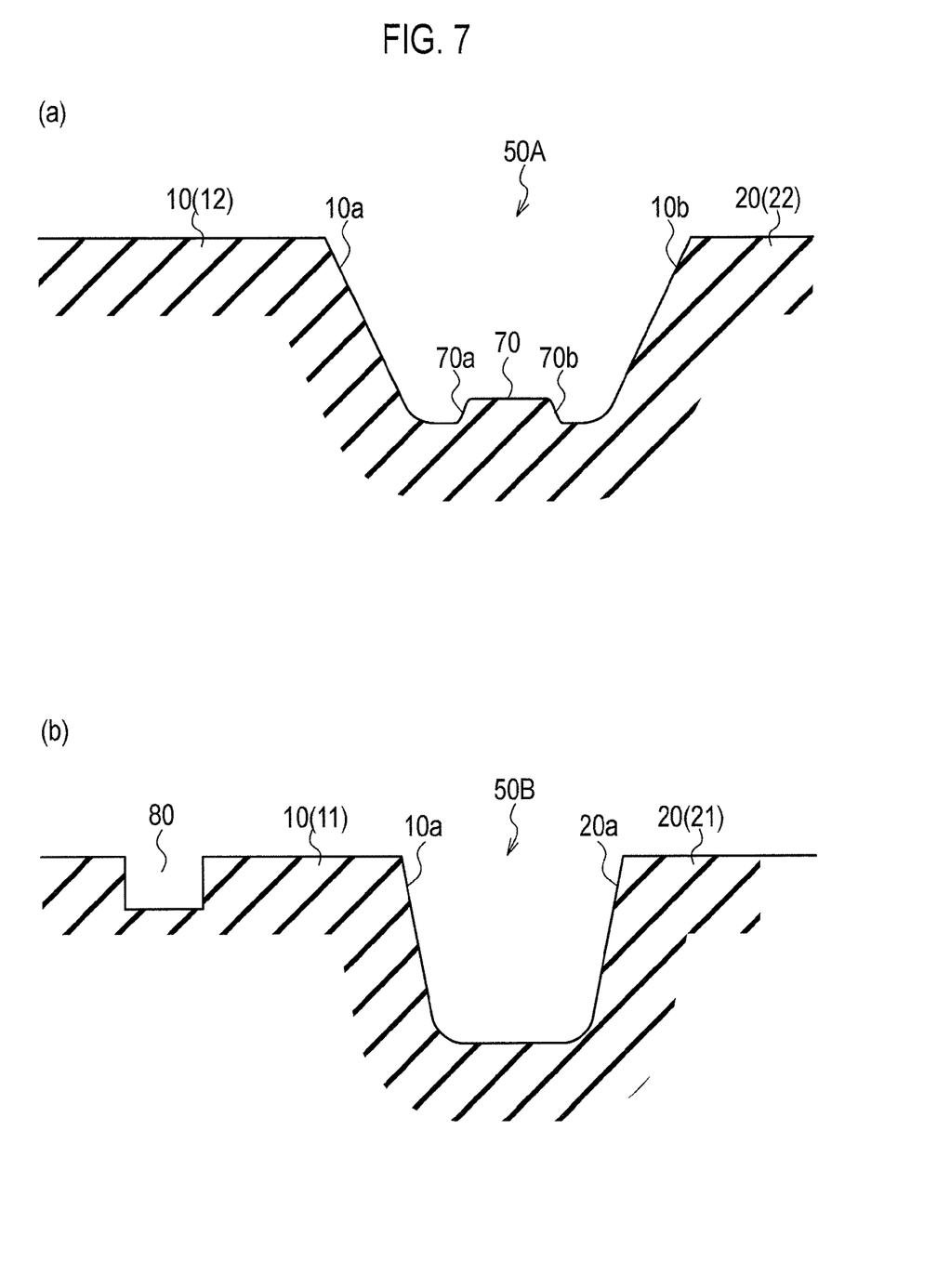

First, the detailed configuration of the main groove 500 of the second embodiment is described with reference to FIGS. 5 to 7. FIG. 5 is a perspective view showing the main groove 500 of the second embodiment and its vicinity. FIG. 6 is an enlarged developed view showing the main groove 500 of the second embodiment. Part (a) of FIG. 7 is a cross-sectional view (cross-sectional view taken along the line A-A in FIG. 6) showing a wide groove portion 50A of the second embodiment. Part (b) of FIG. 7 is a cross-sectional view (cross-sectional view taken along the line B-B in FIG. 6) of a narrow groove portion 50B of the second embodiment.

As shown in FIGS. 5 to 7, raised portions 70 raised outward in a tire radial direction TR are formed on a bottom portion 50*btm* of the main groove 500. Each raised portion 70 is formed to be long in the tire circumferential direction TC in a tread surface view. The raised portions 70 are respectively formed in the wide groove portions 50A and are each provided to be symmetric with the center line (tire equator line CL) of the main groove 500 being the axis in the tread surface view.

Each of the raised portions 70 becomes narrower toward a front end 70*f* (front end section) on a front side in a tire rotating direction R and toward a read end 70*r* (rear end section) on a rear side in the tire rotating direction R in the tread surface view. Moreover, a side portion 70*a* of each raised portion 70 which faces a groove wall 10*a* forming the main groove 500 extends along the groove wall 10*a*. Similarly, a side portion 70*b* of each raised portion 70 which faces a groove wall 20*a* forming the main groove 500 extends along the groove wall 20*a*.

As shown in part (a) of FIG. 7, the height (hereafter, raised height H70) of each raised portion 70 in a tire radial direction TR is preferably smaller than a main groove depth H50 which is the depth of the main groove 500.

An area S50A of the wide groove portion 50A is preferably the same as an area S50B of the narrow groove portion 50B even when the raised portions 70 as described above are provided on the bottom portion 50*btm* of the main groove 500.

(2.2) Detailed Configuration of Land Portions

Next, the detailed configuration of the land portions 10, of the second embodiment is described with reference to FIGS. 5 to 7. Note that, since the land portions 10, 20 have almost the same configuration, the land portion 10 is mainly described.

As shown in FIGS. 5 to 7, recessed portions 80 recessed inward in the tire radial direction TR from a surface of the land portion 10 are formed in a surface (tread contact surface) of wide land portions 11, respectively. In the second embodiment, the recessed portions 80 are formed only in the land portion 10. Note that recessed portions 80 are not necessarily formed only in the land portion 10 and may be formed, for example, in the land portions 20, 30.

Each of the recessed portions 80 are formed to have such a tapered shape that the width dimension in the tread width direction TW gradually becomes smaller toward end portions of the recessed portion 80 in the tire circumferential direction TC in the tread surface view. Specifically, a length L80 of the recessed portion 80 in the tire circumferential direction TC is set to be two to ten times a greatest width dimension W80 of the recessed portion 80 in the tread width direction TW. Moreover, the greatest width dimension W80 of each recessed portion 80 is set to be 10% to 20% of a greatest width dimension W10 of the wide land portion 11 in the tread width direction TW.

As shown in part (b) of FIG. 7, a depth D80 of each recessed portion 80 in the tire radial direction TR is set to be 2.5% to 50% of a depth D50 of the main groove 500 in the tire radial direction TR.

(2.3) Operations and Effects

In the second embodiment described above, the raised portions 70 raised outward in the tire radial direction TR is formed on the bottom portion 50*btm* in the wide groove portions 50A of the main groove 500. In this configuration, the raised portions 70 make it easier for the water flowing in the wide groove portions 50A to flow along the groove wall 10*a* and the groove wall 20*a*. In other words, the raised portions 70 make it easier for the water flowing in the wide groove portion 50A to be drained to the outside of the main groove 500. Hence, the water flowing in the wide groove portion 50A can be drained efficiently and drainage is thereby more surely improved.

In the second embodiment, the side portions 70*a* of the raised portions 70 which face the groove wall 10*a* extend along the groove wall 10*a* and the side portions 70*b* of the raised portions 70 which face the groove wall 20*a* extend along the groove wall 20*a*. This makes it easier for the water flowing in the wide groove portion 50A to flow along the groove wall 10*a* and the groove wall 20*a* and the drainage is thereby more surely improved.

In the second embodiment, each of the raised portions 70 becomes narrower toward the front end 70*f* on the front side in the tire rotating direction R and toward the rear end 70*r* on the rear side in the tire rotating direction R in the tread surface view. This makes it easier for the water flowing in the wide groove portion 50A to flow effectively along the groove wall 10*a* and the groove wall 20*a*, without having the flow abruptly changed by the raised portion 70.

In the second embodiment, the raised portions 70 are provided to be symmetric with the center line (tire equator line CL) of the main groove 500 being the axis in the tread surface view. Accordingly, the raised portions 70 make it easier for the water flowing in the wide groove portion 50A to flow evenly along the groove wall 10*a* and the groove wall 20*a*.

In the second embodiment, the raised height H70 is smaller than the main groove depth H50. This secures a sufficient amount of water flow in the tire circumferential direction TC in the wide groove portions 50A compared to the case where the raised height H70 is equal to or more than the main groove depth H50.

In the second embodiment, the recessed portions 80 recessed inward from the surface of the land portion 10 in the tire radial direction TR are formed in the surfaces of the wide land portions 11. In this configuration, when the land portion 10 deforms due to the contact of the tread with the road surface, deformed portions of rubber moves into the recessed portions 80 and the recessed portions 80 thus serves an escape for the land portion 10. The stiffness of the land portion 10 (wide land portions 11 and narrow land portions 12) is likely to be more even in the tire circumferential direction TC. Accordingly, the contact pressure of the land portion 10 is made even in the tire circumferential direction TC and occurrence of uneven wear and deterioration in driving stability can be thus more surely suppressed.

Moreover, water between the tread and the road surface can be absorbed by the recessed portions 80 and the drainage more surely improved.

In the second embodiment, each of the recessed portions 80 is formed to have such a tapered shaped that the width dimension in the tread width direction TW gradually becomes smaller toward the end portions of the recessed portion 80 in the tire circumferential direction TC in the tread surface view. This makes it easier for a balance in stiffness from the wide land portions 11 to the narrow land portions 12 to be maintained evenly and occurrence of uneven wear and deterioration in driving stability is thus surely suppressed more easily.

In the second embodiment, the length L80 of each recessed portion 80 is set to be two to ten times the greatest width dimension W80 of the recessed portion 80. When the length L80 of the recessed portion 80 is smaller than two times the greatest width dimension W80 of the recessed portion 80, the recessed portion 80 is excessively large in the tread width direction TW and the stiffness of the land portion 10 is thus excessively low in some cases. Meanwhile, when the length L80 of the recessed portion 80 is larger than ten times the greatest width dimension W80 of the recessed portion 80, the recessed portion 80 is excessively small in the tread width direction TW and the stiffness of the land portion 10 is thus excessively high in some cases.

In the second embodiment, the greatest width dimension W80 of each recessed portion 80 is set to be 10% to 20% of the greatest width dimension W10 of each wide land portion 11. When the greatest width dimension W80 of the recessed portion 80 is smaller than 10% of the greatest width dimension W10 of the wide land portion 11, the recessed portion 80 is excessively small in the tread width direction TW and the stiffness of the land portion 10 is thus excessively high in some cases. Meanwhile, when the greatest width dimension W80 of the recessed portion 80 is larger than 20% of the greatest width dimension W10 of the wide land portion 11, the recessed portion 80 is excessively large in the tread width direction TW and the stiffness of the land portion 10 is thus excessively low in some cases.

In the second embodiment, the depth D80 of each recessed portion 80 is set to be 2.5% to 50% of the depth D50 of the main groove 50. When the depth D80 of the recessed portion 80 is smaller than 2.5% of the depth D50 of the main groove 50, the capacity (volume) of the recessed portion 80 is excessively small and water between the tread and the road surface is thus less absorbed by the recessed portion 80 in some cases. Meanwhile, when the depth D80 of the recessed portion 80 is larger than 50% of the depth D50 of the main groove 50, the capacity of the recessed portion 80 is excessively large and the stiffness of the land portion 10 is thus excessively small in some cases.

The second embodiment has been described such that the raised portions 70 are provided in the main groove 50 and the recessed portions 80 are formed in the land portions 10, 20. However, the present invention is not limited to this and only the raised portions 70 or the recessed portions 80 may be provided, as a matter of course.

(3) Comparative Evaluations

Next, descriptions are given of comparative evaluations performed using pneumatic tires of comparative examples and an example described below to further clarify the effects of the present invention. Specifically, (3.1) Configurations of Respective Pneumatic Tires and (3.2) Evaluation Results are described with reference to Table 1. Note that the present invention is not limited at all by these examples.

TABLE 1

|  | Comparative Example 1 | Comparative Example 2 | Example 1 |
| --- | --- | --- | --- |
| Hydroplaning Performance | 100 | 102 | 102 |
| Uneven Wear | Absent | Present | Absent |

(3.1) Configurations of Respective Pneumatic Tires

Data on the pneumatic tires was measured under the following condition.

Tire size: 225/45R17
Rim and wheel sizes: 7.5J×17
Type of tire: Normal Tire (tire other than studless tire)
Vehicle type: Japanese sedan car
Load condition: 600N+weight of driver The pneumatic tire 1 of Example 1 is the pneumatic tire described in the first embodiment (see FIGS. 1 to 4).

Figure 8:
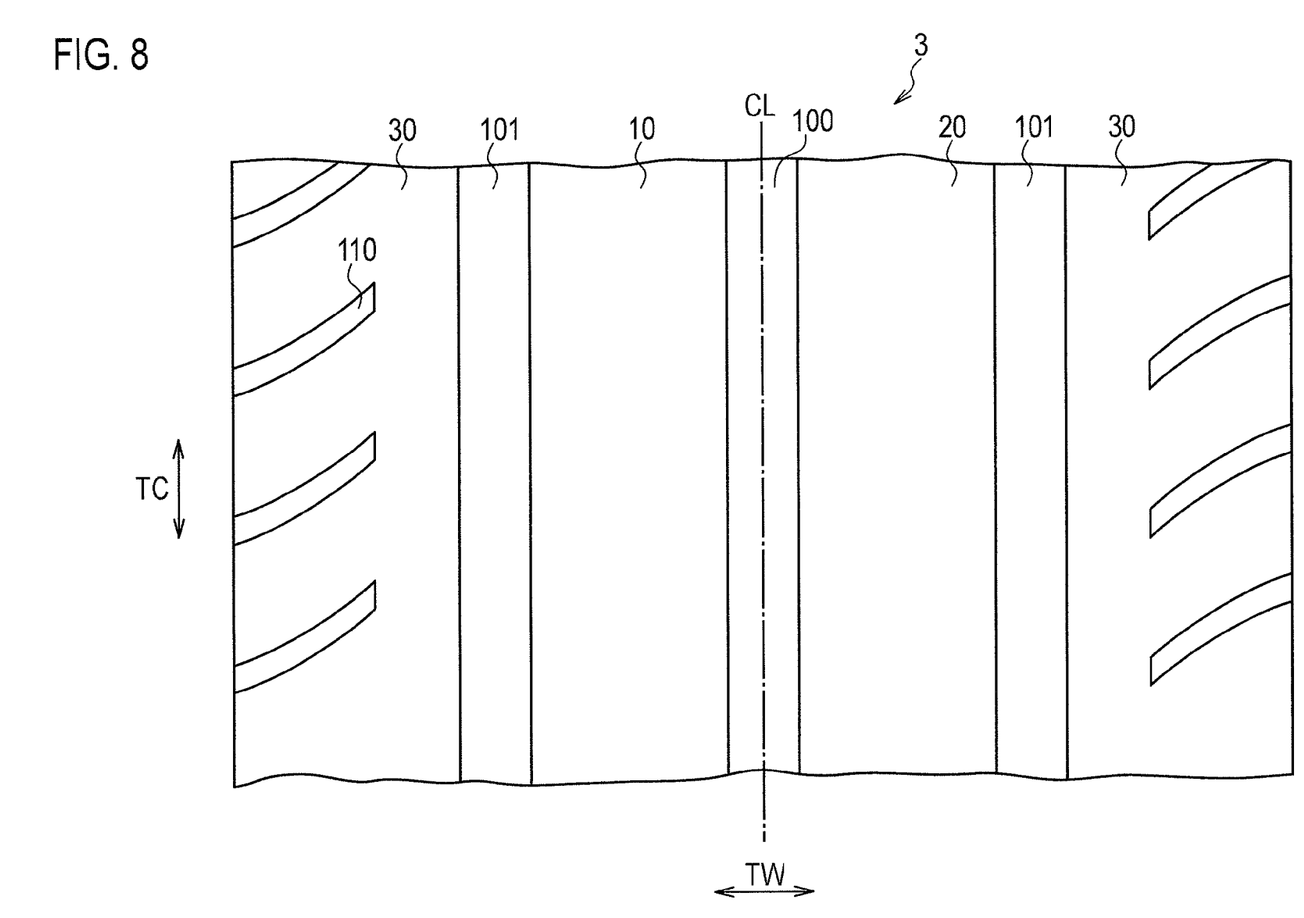
FIG. 8 is a developed view showing a tread pattern of a pneumatic tire 3 of Comparative Example 3.

As shown in FIG. 8, a pneumatic tire 3 of Comparative Example 3 is different from the pneumatic tire of Example in the configuration of a main groove 100 and a main groove 101. Specifically, the pneumatic tire 3 is different from the pneumatic tire 1 of Example 1 shown in FIG. 1 in such a point that groove walls forming the main groove 100 and the main groove 101 do not meander and are formed almost linearly in the tire circumferential direction TC.

The pneumatic tire of Comparative Example 2 is different from the pneumatic tire 1 of Example 1 shown in FIG. 1 in such a point that the groove wall 10a and the groove wall 20a forming the main groove 50 extend along the tire normal lines RL (θ1 and θ2 are 0°).

(3.2) Evaluation Results
(3.2.1) Hydroplaning Test

Vehicles fitted with the pneumatic tires were made to enter a rainy road with a water depth of 10 mm at a speed of km/h and were then accelerated. A speed at which hydroplaning occurred in the vehicle fitted with the pneumatic tires 3 of the comparative example 1 was taken as "100" and speed at which hydroplaning occurred in the vehicles fitted with the other types of pneumatic tires were indicated by indices. A larger index means that hydroplaning is less likely to occur.

As a result, as shown in Table 1, it is found the vehicle fitted with the pneumatic tires of Example 1 is less likely to cause hydroplaning than the vehicle fitted with the pneumatic tires 3 of Comparative Example 1.

(3.2.2) Uneven Wear Test

Vehicles fitted with the respective types of pneumatic tires were each driven for 10,000 km and uneven wear in each type of pneumatic tires was evaluated by being observed visually (two-grade evaluation of present and absent)

As a result, as shown in Table 1, it is found that the vehicle fitted with the pneumatic tires of Example 1 causes small uneven wear as is the case with the vehicle fitted with the pneumatic tires of Comparative Example 1. Moreover, it is concluded that the vehicle fitted with the pneumatic tires of Example 1 causes such small uneven wear (judged as absent) that Example 1 can suppress the deterioration in driving stability by scarcely having unevenness in the contact pressure in the land portions in contact with the road surface.

(4) Other Embodiments

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

For example, the embodiments of the present invention can be modified as follows. Specifically, the tire may be the pneumatic tire 1 filled with air, a nitride gas, or the like or may be a solid tire filled with no air, nitride gas, or the like.

The numbers and the arrangements of the land portions and the main groove 50 provided in the pneumatic tire described above are not limited to the ones described in the embodiment and may be selected appropriately depending on a purpose, as a matter of course. For example, the main groove 50 is not necessary provided on the tire equator line CL and may be provided on the outer side of the tire equator line CL in the tread width direction TW, as a matter of course.

In the embodiment described above, at least the land portions and the main groove 50 need to be provided in the pneumatic tire. For example, lug grooves may be provided in addition. In this case, the lug grooves are preferably provided in the directions of the extended lines of the streamline S10a and the streamline S20a (see FIG. 3). This makes it easier for the water flowing in the main groove 50 to be drained in the directions of the extended lines of the streamlines.

In the embodiments described above, the groove wall 10a and the groove wall 20a are described as repeatedly meandering in the tire circumferential direction TC in the tread surface view. However, the present invention is not limited to this. The groove wall 10a and the groove wall 20a do not need to repeatedly meander and, for example, may be partially provided to be linear in the tire circumferential direction TC.

In the embodiments described above, the groove wall 10a and the groove wall 20a may each have a shape which changes at a predetermined repetition cycle in the tire circumferential direction TC in the tread surface view and in which a front portion and a rear portion in each cycle are symmetric to each other with the greatest-width section WMAX being a boarder between the front portion and the rear portion.

In the embodiments described above, θ1 is described as the angle formed between each of the groove wall 10a and the groove wall 20a forming the wide groove portions 50A and the corresponding tire normal line RL. However, the present invention is not limited to this and θ1 may be an angle formed between at least one of the groove wall 10a and the groove wall 20a forming the wide groove portions 50A and the corresponding tire normal line RL.

In the embodiment described above, the center line of the main groove 50 is described as coinciding with the tire equator line CL. However, the present invention is not limited to this and the center line of the main groove 50 and the tire equator line CL may be offset from each other.

Similarly, θ2 is described as the angle formed between each of the groove wall 10a and the groove wall 20a forming the narrow groove portion 50B and the corresponding tire normal line RL. However, the present invention is not limited to this and θ2 may be an angle formed between any one of the groove wall 10a and the groove wall 20a forming the narrow groove portion 50B and the corresponding tire normal line RL.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2010-016418 (filed on Jan. 28, 2010) is incorporated herein by reference.

INDUSTRIAL APPLICABILITY

Even having the circumferential groove formed in the tread, the tire of the present invention can surely suppress occurrence of uneven wear and the deterioration in driving stability with the drainage being improved. Hence, the present invention is useful in tires used for vehicles and the like.

The invention claimed is:

1. A tire comprising at least a land portion formed by a main groove extending in a tire circumferential direction, the land portion including: a first land portion having a first groove wall forming the main groove; and a second land portion having a second groove wall forming the main groove, wherein
the first groove wall and the second groove wall meander in the tire circumferential direction in a tread surface view,
a groove width of the main groove in a tread width direction changes at a predetermined repetition cycle in the tire circumferential direction,
the main groove includes:
a wide groove portion in which the groove width is a predetermined width; and
a narrow groove portion which is continuous with the wide groove portion and which is narrower than the predetermined width, and
a relationship of θ1>θ2 is satisfied in a cross section taken in the tread width direction and a tire radial direction where θ1 refers to an angle formed between a tire normal line extending in the tire radial direction and at least one of the first groove wall and the second groove wall forming the wide groove portion and θ2 refers to an angle formed between the tire normal line and at least one of the first groove wall and the second groove wall forming the narrow groove portion,
wherein the first groove wall and the second groove wall are symmetric to each other in the tread surface view with a center line being an axis of symmetry, the center line passing through a center of the main groove in the tread width direction.

2. The tire according to claim 1, wherein the area of the wide groove portion and the area of the narrow groove portion are the same in cross sections in the tread width direction and the tire radial direction.

3. The tire according to claim 1, wherein
a raised portion raised outward in the tire radial direction is formed in a bottom portion of the main groove, and
the raised portion is formed in the wide groove portion.

4. The tire according to claim 3, wherein
a first side portion of the raised portion which faces the first groove wall extends along the first groove wall, and
a second side portion of the raised portion which faces the second groove wall extends along the second groove wall.

5. The tire according to claim 3, wherein the raised portion becomes narrower toward a front end section and a rear end section of the raised portion in the tread surface view.

6. The tire according to claim 3, wherein a height of the raised portion is smaller than a depth of the main groove.

7. The tire according to claim 1, wherein
the land portion includes:
a wide land portion in which a width of the land portion in the tread width direction is a predetermined width; and
a narrow land portion which is narrower than the predetermined width, and
a surface of the wide land portion is provided with a recessed portion recessed from a surface of the land portion inward in the tire radial direction.

8. The tire according to claim 7, wherein the recessed portion is formed to have such a tapered shape in the tread surface view that a width dimension in the tread width direction gradually becomes smaller toward an end portion thereof in the tire circumferential direction.

* * * * *